Patented Nov. 22, 1932

1,888,757

UNITED STATES PATENT OFFICE

ACHILLE CONZETTI, OF BASEL, SWITZERLAND, ASSIGNOR TO THE FIRM J. R. GEIGY S. A., OF BASEL, SWITZERLAND

BLACK TRISAZO DYESTUFFS AND THEIR PRODUCTION

No Drawing. Application filed December 30, 1931, Serial No. 584,008, and in Germany January 16, 1931.

According to this invention particularly valuable black trisazo dyestuffs are made by combining with a substitution product of 2-aminonaphthalene which contains in 6- or 7-position an amino group or hydroxyl group, but contains no sulphonic acid group, in an alkaline medium, a diazo compound of an amino-disazo dyestuff made by coupling a monodiazo compound with a monoazo dyestuff obtainable by coupling a 4:4'-tetrazodiphenyl with an equimolecular proportion of 1-amino-8-hydroxynaphthalene-3:6-disulphonic acid in an acid medium.

The dyestuffs obtainable in accordance with the invention have the following formula:

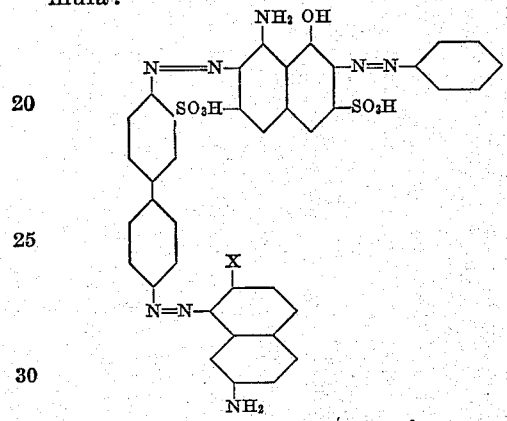

wherein X represents an amino group or a hydroxyl group. They dye cotton, wool, artificial silk, silk and mixed fabrics thereof deep greenish-black or bluish-black shades.

The new dyestuffs are distinguished from the analogous dyestuffs described in German Patent No. 423,092 and containing as end component 1:5- or 1:8-naphthylene-diamine, apart from the difference in shade, particularly by their complete fastness to acids and alkalies. They, therefore, possess the great advantage that they are capable of use in cases in which a subsequent brightening (avivage) is necessary.

The following examples illustrate the invention:

*Example 1*

18.4 kilos of benzidine are tetrazotized in the usual manner and coupled in presence of mineral acid, such as hydrochloric or sulphuric acid, with 24.1 kilos of 1:8-aminonaphthol-3:6-disulphonic acid (mono-sodium salt). When the formation of the intermediate product is completed, it is combined in a solution alkaline with sodium carbonate with a diazo benzene solution prepared from 9.3 kilos of aniline. As soon as the diazo benzene has disappeared there is run in all at once a solution of 16 kilos of 2:7-naphthylene-diamine in 250 litres of water and 15 kilos of concentrated hydrochloric acid. After the whole has been stirred during several hours the dyestuff is worked up in the customary manner. It dyes cotton, wool, artificial silk, silk and mixed fabrics thereof deep greenish-black shades which are completely fast to acid.

*Example 2*

The intermediate product prepared as described in Example 1 and having the constitution

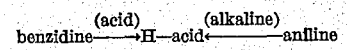

is mixed all at once with a solution prepared by dissolving 15.9 kilos of 2:7-aminonaphthol in 200 litres of water with the aid of caustic soda solution. On the following day the whole is heated to 40° C. and the dyestuff is isolated by salting out and worked up in the usual manner.

The dyestuff dyes cotton, wool, artificial silk, silk and mixed fabrics thereof deep blue-black shades completely fast to acid.

The invention may be carried out in an analogous manner when there are used tetrazo compounds of other paradiamines, such as for instance dianisidine, a substituted 4:4'-tetrazodiphenyl, etc. Instead of diazo benzene there may be used other mono-diazoaryl compounds, such as for example the diazo compounds of chloraniline, toluidine and homologues thereof.

What I claim is:—

1. A process for the manufacture of black trisazo dyestuffs, consisting in coupling a monodiazo compound of the benzene series with a monoazo dyestuff obtained from a tetrazotized paradiamine and 1-amino-8- hydroxynaphthalene-3:6-disulphonic acid in an acid medium and combining the intermediate diazo compound thus obtained in an alkaline solution with a substitution product of 2-amino-naphthalene containing in one of positions 6 and 7 an amino or hydroxyl group, but containing no sulphonic acid group.

2. A process for the manufacture of black trisazo dyestuffs, consisting in coupling a monodiazo compound of the benzene series with a monoazo dyestuff obtained from tetrazotized benzidine and 1-amino-8-hydroxynaphthalene-3:6-disulphonic acid in an acid medium and combining the intermediate diazo compound thus obtained in an alkaline solution with a substitution product of 2-amino-naphthalene containing in one of positions 6 and 7 an amino or hydroxyl group, but containing no sulphonic acid group.

3. The hereinbefore described trisazo dyestuffs from a combination of a substitution product of 2-aminonaphthalene containing in one of positions 6 and 7 an amino or hydroxyl group, but containing no sulphonic acid group, with a diazo compound obtained by means of a monodiazo compound and a monoazodyestuff from a 4:4'-tetrazodiphenyl and 1-amino-8-hydroxynaphthalene-3:6-disulphonic acid, said dyestuffs having the formula:

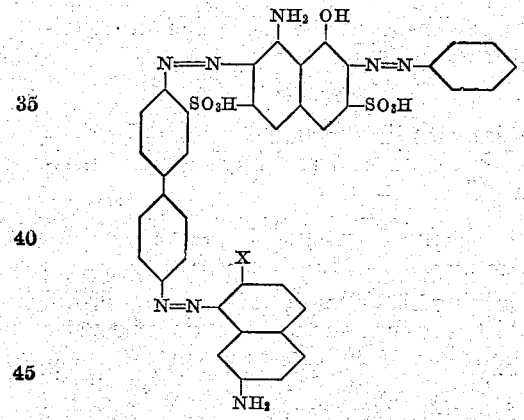

wherein X represents an amino group or a hydroxyl group, and dyeing cotton, wool, artificial silk, silk and mixed fabrics thereof deep greenish-black to bluish-black shades, being completely fast to acids and alkalies.

In witness whereof I have hereunto signed my name this 18th day of December, 1931.

ACHILLE CONZETTI.